United States Patent
Ito

(10) Patent No.: US 9,583,062 B2
(45) Date of Patent: Feb. 28, 2017

(54) ELECTRO-OPTICAL DEVICE AND ELECTRONIC APPARATUS

(75) Inventor: Akihiko Ito, Tatsuno-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 606 days.

(21) Appl. No.: 13/216,139

(22) Filed: Aug. 23, 2011

(65) Prior Publication Data

US 2012/0050353 A1 Mar. 1, 2012

(30) Foreign Application Priority Data

Aug. 24, 2010 (JP) ................. 2010-187640

(51) Int. Cl.
*G09G 3/36* (2006.01)
*H04N 13/04* (2006.01)
*G09G 3/00* (2006.01)

(52) U.S. Cl.
CPC ........... *G09G 3/3677* (2013.01); *G09G 3/003* (2013.01); *G09G 3/3648* (2013.01); *G09G 3/3688* (2013.01); *H04N 13/0438* (2013.01); *G09G 3/001* (2013.01); *G09G 3/3614* (2013.01); *G09G 2310/02* (2013.01); *G09G 2310/0205* (2013.01); *G09G 2310/0224* (2013.01); *G09G 2310/0251* (2013.01); *G09G 2310/0297* (2013.01)

(58) Field of Classification Search
CPC ....... G09G 2310/02; G09G 2310/0205; G09G 2310/0224; G09G 2310/0251; G09G 2310/0297; G09G 3/001; G09G 3/003; G09G 3/3614; G09G 3/3648; G09G 3/3677; G09G 3/3688; H04N 13/0438

USPC ............. 348/42, 51–58, E13.001, E13.075; 345/691

See application file for complete search history.

(56) References Cited

U.S. PATENT DOCUMENTS

| 2004/0041760 A1* | 3/2004 | Tsumura et al. ................. 345/87 |
| 2010/0066820 A1* | 3/2010 | Park et al. ....................... 348/53 |
| 2010/0091095 A1* | 4/2010 | Sung et al. ...................... 348/53 |
| 2010/0238274 A1* | 9/2010 | Kim et al. ....................... 348/51 |
| 2010/0315494 A1* | 12/2010 | Ha et al. .......................... 348/53 |
| 2011/0007140 A1 | 1/2011 | Nakahata et al. |
| 2011/0292041 A1* | 12/2011 | Lee et al. ...................... 345/419 |

FOREIGN PATENT DOCUMENTS

| JP | 2009-025436 A | 2/2009 |
| JP | 2011-018993 A | 1/2011 |

\* cited by examiner

*Primary Examiner* — Kenneth Bukowski
(74) *Attorney, Agent, or Firm* — Maschoff Brennan

(57) ABSTRACT

A right unit period corresponding to a right-eye image and a left unit period corresponding to a left-eye image are set alternately. The scanning line driving circuit selects the plurality of scanning lines in several units at each right unit period, the glasses control circuit controls both of the shutter for the right eye and the shutter for the left eye to be in the closed state at least a portion of an image update period at which the data line driving circuit supplies a gradation potential corresponding to the right-eye image to each data line and the glasses control circuit controls the shutter for the right eye to be in the opened state and controls the shutter for the left eye to be in the closed state at the display period after the lapse of the image update period.

8 Claims, 18 Drawing Sheets

FIG. 5

| | ROW NUMBER | | IMAGE LINE NUMBER |
|---|---|---|---|
| Wser | 1 | | #1 |
| | 2 | | #2 |
| | 3 | | #3 |
| | 4 | | #4 |
| | 5 | | #5 |
| | 6 | | #6 |
| | ⋮ | ⋮ | ⋮ |
| | M-1 | | #(M-1) |
| | M | | #M |

| | ROW NUMBER | | IMAGE LINE NUMBER |
|---|---|---|---|
| Wmul | 1 | | #1 |
| | 2 | | #1 |
| | 3 | | #3 |
| | 4 | | #3 |
| | 5 | | #5 |
| | 6 | | #5 |
| | ⋮ | ⋮ | ⋮ |
| | M-1 | | #(M-1) |
| | M | | #(M-1) |

42

ELECTRO-OPTICAL DEVICE AND ELECTRONIC APPARATUS

BACKGROUND

1. Technical Field

The present invention relates to a technology for displaying a right-eye image and a left-eye image having different parallaxes so that an observer perceives a three-dimensional image.

2. Related Art

A frame sequential-type stereoscopic display method alternately displaying a left-eye image and a right-eye image with time division has been proposed in the related art. Since the left-eye image and the right-eye image are mixed at a period when any one of the left-eye image and the right-eye image is rewritten to the other, it is difficult for an observer to clearly recognize stereoscopic viewing images when he/she views the images. To solve this problem, for example, JP-A-2009-25436 discloses a technology in which both of the shutter for the right-eye and the shutter for the left-eye of the stereoscopic viewing glasses at the period when any one of the left-eye image and the right-eye image is rewritten to the other (in other words, the period when the left-eye image and the right-eye image are mixed) are in a closed state so that the observer cannot view the display.

Specifically, as shown in FIG. 21, the left unit period and the right unit period corresponding to each of the left-eye images and the right-eye images are set alternately. The display image is updated from the left-eye image to the right-eye image at a first half period of the right unit period and the right-eye image is displayed at the second half period. Further, the display image is updated from the right-eye image to the left-eye image at the first half period of the left unit period and the left-eye image is displayed at the second half period. Both of the shutter for the right eye and the shutter for the left eye are controlled to be in the closed state at the first half period (that is, the period when the left-eye image and the right-eye image are mixed) of each of the right unit periods and the left unit periods.

According to a configuration of JP-A-2009-25436, a period when a user can view the image is limited to a second half (i.e. about half) at each of the right unit periods and the left unit periods. Thus, there is a problem in that it is difficult to ensure sufficient brightness of the display image.

SUMMARY

An advantage of some aspects of the present invention is that it provides an electro-optical device to improve the brightness of the display image while suppressing for the user to perceive the mixing of the left-eye image and the right-eye image.

To solve this problem, according to an aspect of the present invention, there is provided an electro-optical device which displays a right-eye image and a left-eye image that are seen with stereoscopic viewing glasses having a shutter for a right eye and a shutter for a left eye. The electro-optical device may include a plurality of pixel circuits arranged corresponding to each intersection of a plurality of the data lines and a plurality of scanning lines and each displaying gradation according to the potential gradation supplied to the data line when selecting the scanning lines; a scanning line driving circuit selecting each scanning line; a data line driving circuit supplying a gradation potential to each data line, and a glasses control circuit controlling each of the shutter for the right eye and the shutter for the left eye to be in the opened state or the closed state, wherein a right unit period corresponding to a right-eye image and a left unit period corresponding to a left-eye image are alternately set, and among each right unit period, in at least a portion of an image update period in which the scanning line driving circuit selects the plurality of scanning lines in several units and the data line driving circuit supplies a gradation potential corresponding to the right-eye image to each data line, the glasses control circuit controls both of the shutter for the right eye and the shutter for the left eye to be in the closed state and the glasses control circuit controls the shutter for the right eye to be in the opened state and controls the shutter for the left eye to be in the closed state at the display period after the lapse of the image update period, the scanning line driving circuit selects the plurality of scanning lines in several units at each left unit period, the glasses control circuit controls both of the shutter for the right eye and the shutter for the left eye to be in the closed state at least a portion of an image update period at which the data line driving circuit supplies a gradation potential corresponding to the left-eye image to each data line, and the glasses control circuit controls the shutter for the left eye to be the opened state and controls the shutter for the right eye to be in the closed state at the display period after the lapse of the image update period.

With this configuration, since the scanning lines are selected in several units to supply the gradation potential to the data lines at the image update period, when comparing with the configuration in which the scanning lines are selected in one unit at the image update period, the duration of the image update period is short, wherein at least a part of the duration of the image update period includes the period when both of the shutter for the right eye and the shutter for the left eye are set to be in the closed state. Therefore, it is possible to improve the brightness of the display image to be recognized by the observer.

It is preferable that the scanning line driving circuit sequentially select the plurality of scanning lines one by one and the data line driving circuit supply the gradation potential corresponding to the right-eye image to each data line, at the display period of each right unit period, and the scanning line driving circuit sequentially select the plurality of scanning lines one by one and the data line driving circuit supply the gradation potential corresponding to the left-eye image to each data line, at the display period of each left unit period.

In the above embodiment, the scanning lines are sequentially selected one by one at the display period to supply the gradation potential from the data lines and therefore, the decrease in the longitudinal resolution of the display image caused by selecting a plurality of scanning lines at the image update period is solved. Thus, there is an advantage in that an observer cannot view the decrease in the resolution of the display image.

It is preferable that the data line driving circuit supply a potential according to a designated gradation of each pixel circuit corresponding to first scanning line of the scanning lines selected in several units to each data line at the display update period of each right unit period and sequentially select a second scanning line other than the first scanning line of the scanning lines selected in several units at the display period of each right unit period, and the data line driving circuit supply a potential according to the designated gradation of each pixel circuit corresponding to first scanning line of the scanning lines selected in several units to each data line at the display update period of each left unit period and sequentially select the second scanning line other than the first scanning line of the scanning lines selected in several units at the display period of each left unit period.

In the above embodiment, after the low-resolution image is displayed at the end of the image update period, the gradation potential that is not supplied at the image update period is complementarily supplied at the display period, such that the decrease in the resolution of the display image is eliminated. In this aspect, since the first scanning lines are not selected at the display period, when comparing with the aspect selecting the scanning lines one by one at the display period, the display period is short. Therefore, it is possible to shorten the time until the target resolution image is displayed.

It is preferable that the data line driving circuit supply the potential according to the designated gradation of each pixel circuit corresponding to the first scanning line of the scanning lines selected in several units to each data line at the display update period of each right unit period and sequentially select the second scanning line other than the first scanning line of the scanning lines selected in several units at the display period of each right unit period, and the scanning line driving circuit sequentially select the plurality of scanning lines one by one and the data line driving circuit supplies the gradation potential corresponding to the right-eye image to each data line, the data line driving circuit supply the potential according to the designated gradation of each pixel circuit corresponding to the first scanning line of the scanning lines selected in several units to each data line at the display update period of each left unit period and sequentially select the second scanning line other than the first scanning line of the scanning lines selected in several units at the display period of each left unit period, and the scanning line driving circuit sequentially select the plurality of scanning lines one by one and the data line driving circuit supplies the gradation potential corresponding to the left-eye image to each data line.

In the above embodiments, first, the second scanning lines are sequentially selected at the display period to supply the gradation potential and then, the plurality of scanning lines are sequentially selected to supply the gradation potential. However, it is possible to reduce the time until the target resolution image is displayed, thereby improving the brightness of the display image to be recognized by the observer due to the extension of the display period.

It is preferable that the scanning line driving circuit select the plurality of scanning lines in several units and the data line driving circuit supply the gradation potential corresponding to the right-eye image to each data line, at the display period of each right unit period, and the scanning line driving circuit select the plurality of scanning lines in several units and the data line driving circuit supply the gradation potential corresponding to the left-eye image to each data line, at the display period of each left unit period.

In the above embodiments, there is no need to select the scanning lines one by one in the scanning line driving circuit. Therefore, it is possible to display the left-eye image and right-eye images even when the driving capability of the scanning line driving circuit is lowered.

In a preferred embodiment of the present invention, the scanning line driving circuit may include a signal generator sequentially outputting a control pulse of a system K, and K logical circuits outputting a logical product of each of the control pulses of the system K and the enable signals as a scanning signal indicating the selecting/selected of the scanning lines to the scanning line, wherein the signal generator is controlled so that the control pulses of the system K overlap each other at the image update period, the enable signals of each of the K logical circuits are set to be an active level in parallel within an overlapping period for the control pulses of the system K and the signal generator is controlled so that the control pulses of the system K are sequentially output at the display period. In addition, the scanning line driving circuit also includes a control circuit for sequentially setting the enable signal to be supplied to each logical circuit to be the active level for each selecting period corresponding to each transfer pulse.

According to the above configuration, it is possible to arbitrarily switch the number of scanning lines that can be simultaneously selected by controlling each of the enable signals.

The electro-optical device According to the above embodiment is adopted as a display of various electronic apparatus.

BRIEF DESCRIPTION OF THE DRAWINGS

The present invention will be described with reference to the accompanying drawings, in which like numbers reference like elements.

FIG. 5 shows a display example of a stereoscopic viewing image.

FIG. 6 shows a display example of the stereoscopic viewing image.

DESCRIPTION OF EXEMPLARY EMBODIMENTS

A: First Embodiment

Figure 1:
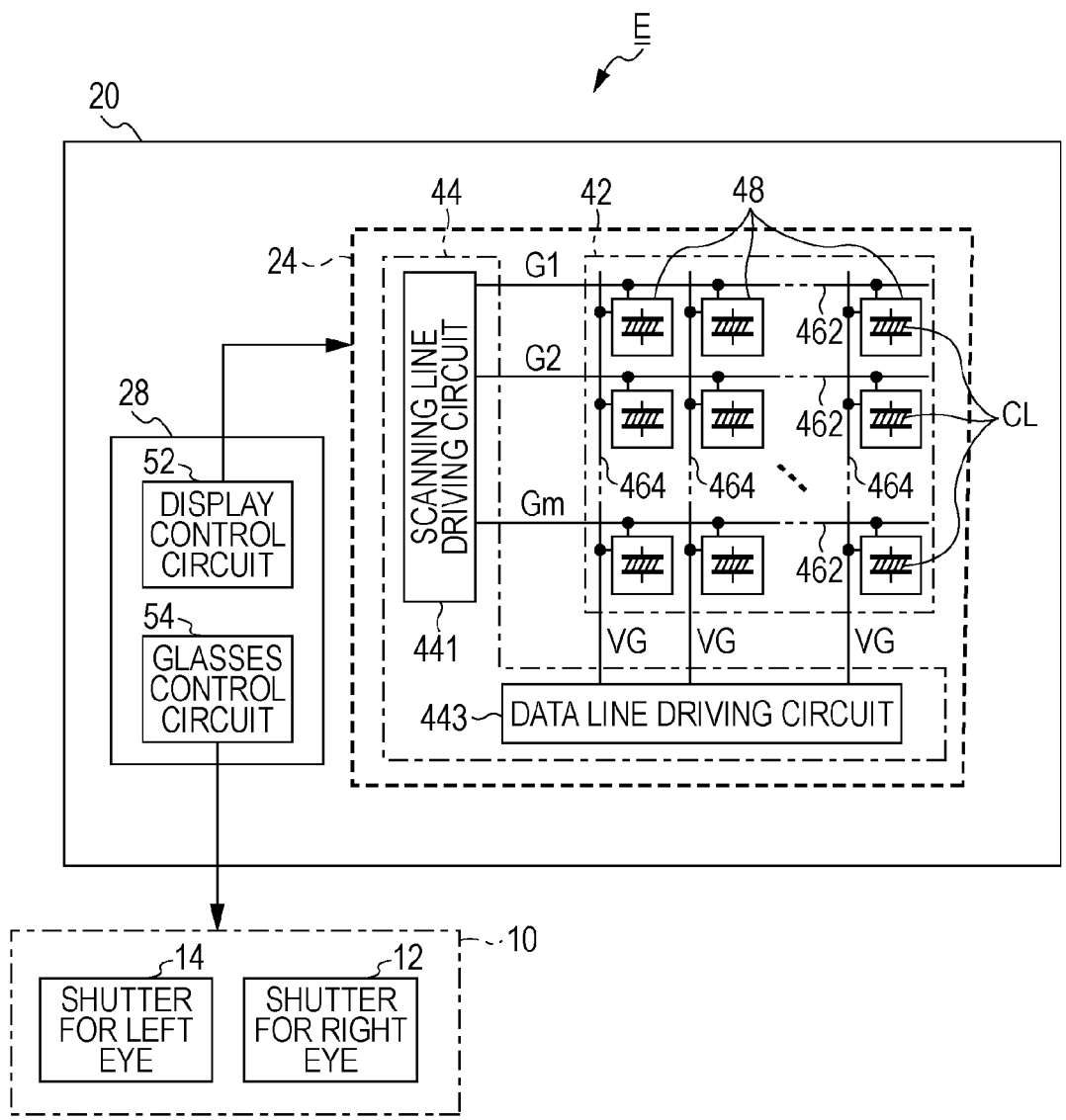
FIG. 1 shows a configuration of an electronic apparatus according to an embodiment of the present invention.

FIG. 1 is a block diagram for an electronic apparatus E in accordance with a first embodiment of the present invention. The electronic apparatus E displays a stereoscopic viewing image that enables an observer to perceive a three-dimensional image using a frame sequential scheme. As shown FIG. 1, the electronic apparatus E includes stereoscopic viewing glasses 10 and an electro-optical device 20.

Stereoscopic viewing glasses 10 of FIG. 1 are glasses-type instruments worn by the observer when viewing the stereoscopic viewing image displayed by an electro-optical device 20. The stereoscopic viewing glasses 10 of FIG. 1 includes a shutter 12 for a right eye which is positioned in front of the right eye of the observer and a shutter 14 for a left eye which is positioned in front of the left eye of the observer. Each of the shutter 12 for the right eye and the shutter 14 for the left eye is controlled to be in an opened state for transmitting irradiated light and a closed state for blocking the irradiated light. For example, a liquid crystal shutter in which any one of the opened state and the closed state is changed to the other in accordance with the alignment direction of the liquid crystals according to an applied voltage is adopted as the shutter 12 for the right eye and the shutter 14 for the left eye.

An electro-optical device 20 of FIG. 1 includes an electro-optical panel 24 and a control circuit 28. The electro-optical panel 24 includes a pixel unit 42 in which a plurality of pixel circuits 48 is arranged and a driving circuit 44 driving each pixel circuit 48. The pixel unit 42 includes M scanning lines 462 and N data lines 464 for intersecting each other (M and N is a natural number). Each pixel circuit 48 is arranged in a matrix state having M rows in height×N columns in width corresponding to each intersection between scanning lines 462 and data lines 464.

The driving circuit 44 includes an scanning line driving circuit 441 for sequentially selecting each scanning line 462 by outputting scanning signals G1 to GM to each scanning line 462 and an data line driving circuit 443 for supplying an gradation potential VG to each of the N data lines 464 in synchronization with a selection of the scanning line 462. The gradation potential VG is variably set according to the gradation (that is, each pixel value of the display images) designated by an image signal VID supplied from an outside circuit and the polarity of a predetermined reference potential is inverted periodically.

Figure 2:
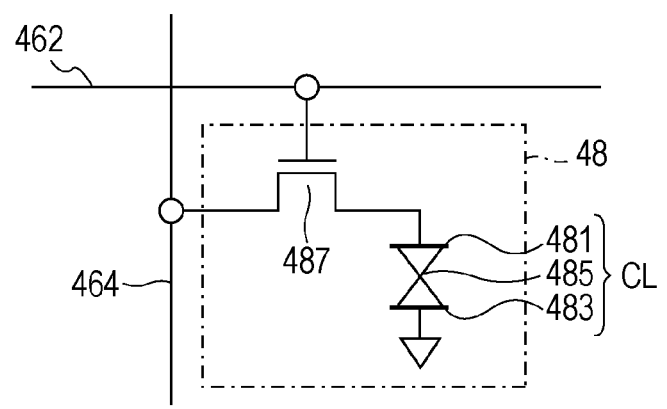
FIG. 2 shows a configuration example of a pixel circuit of the present invention.

FIG. 2 is a circuit diagram of each pixel circuit 48. As shown in FIG. 2, each pixel circuit 48 includes a liquid crystal element CL and a selection switch 487. The liquid crystal element CL is the electro-optical element including a pixel electrode 481, a common electrode 483, and a liquid crystal 485 between the pixel electrode 481 and the common electrode 483 facing each other. The transmittance of the liquid crystal 485 is varied according to the applied voltage between a pixel electrode 481 and a common electrode 483.

The selection switch 487 is configured by an N-channel type thin film transistor of which the gate is connected to scanning lines 462 and is interposed between the liquid crystal element CL and the data lines 464 to control an electrical connection (conducting/non-conducting) therebetween. Therefore, when the selection switch 487 is controlled to be in an ON state, the pixel circuits 48 (the liquid crystal element CL) display a gradation according to a potential (the gradation potential VG) of the data lines 464. In addition, an auxiliary capacitor, and the like, connected in parallel with the liquid crystal element CL is not shown and the description thereof will be also omitted.

The control circuit 28 of FIG. 1 includes a display control circuit 52 controlling the electro-optical panel 24 and a glasses control circuit 54 controlling the stereoscopic viewing glasses 10. In addition, the configuration is adopted where the display control circuit 52 and the glasses control circuit 54 are integrally mounted on single integration circuit or the configuration that the display control circuit 52 and the glasses control circuit 54 are separately distributed on an integration circuit. Hereinafter, a concrete operation of the control circuit 28 will be described with reference to FIG. 3.

Figure 3:
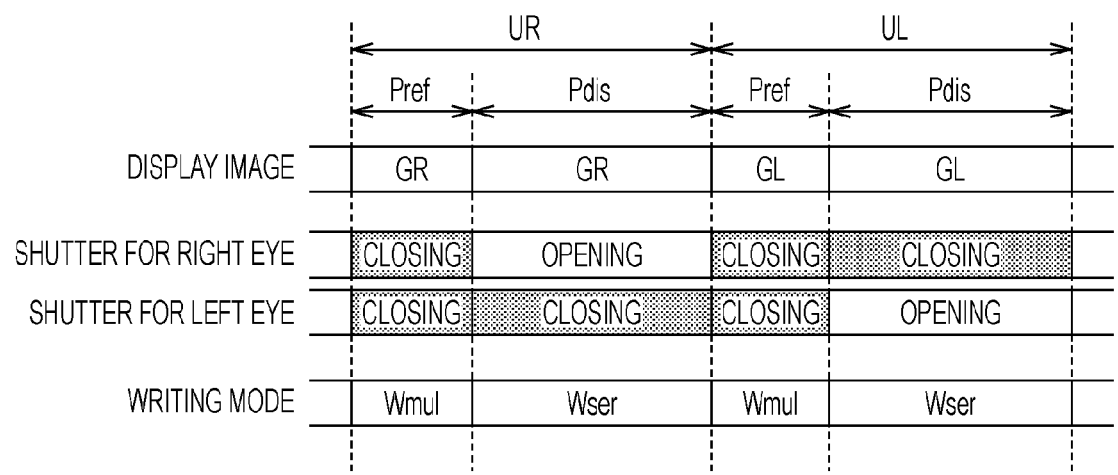
FIG. 3 illustrates an operation example of an electro-optical device.

The display control circuit 52 of the control circuit 28 controls the electro-optical panel 24 so that a right-eye image GR and a left-eye image GL having different parallaxes are displayed in time division. As shown in FIG. 3, an operation period in the electro-optical panel 24 is divided into a plurality of unit periods U (UR, UL). The right unit period UR for displaying the right-eye image GR and the left unit period UL for displaying an image for the left-eye GL are set alternately. Each of the right unit period UR and the left unit period UL includes an image update period Pref and a display period Pdis. The image update period Pref is positioned before the start (immediately before) of the display period Pdis. The image for the left-eye GL displayed at the display period Pdis of the immediately previous left unit period UL is rewritten into the image for the right-eye GR at the image update period Pref of the right unit period UR. In addition, the right-eye image GR displayed at the display period Pdis of the immediately previous right unit period UL is rewritten with the left-eye image GL at the image update period Pref of the left unit period UL.

As shown in FIG. 3, the display control circuit 52 controls the driving circuit 44 by selecting a writing mode at each unit period U. Single sequence writing mode Wser and a plurality of writing modes Wmul are included in the writing mode. As shown in FIG. 3, the display control circuit 52 controls the driving circuit 44 so that the driving circuit 44 is operated by a plurality of writing modes Wmul at the image update period Pref within each unit period U and the driving circuit 44 is operated by the single sequence writing mode Wser at the display period Pdis.

The single sequence writing mode Wser is an operation mode for supplying (writing) the gradation potential VG to each row with respect to each pixel circuit 48. A plurality of writing modes Wmul is an operation mode for supplying the gradation potential VG to each row k for each pixel circuit 48. Hereinafter, the operation of the driving circuit 44 is described in detail with reference to the case of k=2. In addition, an image (that is to say, one row of the display image) in which N pixel circuits 48 corresponding to single scanning lines 462 display is notated as "an image line".

Figure 4:
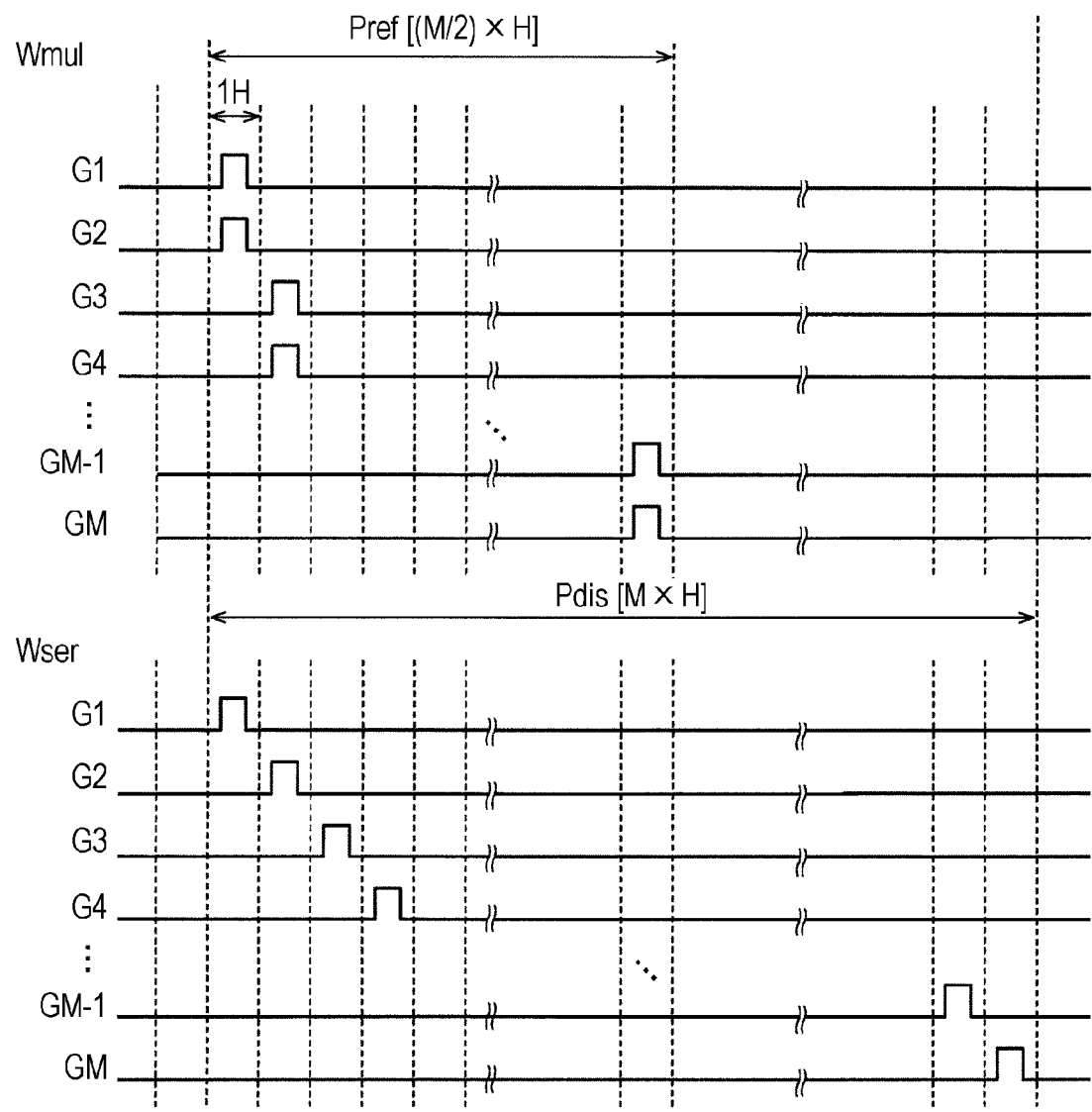
FIG. 4 shows an example of a driving time chart.

As shown in FIG. 4, the display control circuit 52 controls scanning line driving circuit 441 so that M scanning lines 462 is sequentially selected one by one for each horizontal scanning period H (the single sequence writing mode Wser) at the display period Pdis of each unit period U (UR, UL). Therefore, the display period Pdis includes M horizontal scanning periods (M×H).

Specifically, as shown in FIG. 5, one scanning line 462 of an ma-th row is selected at an ma-th (ma=1 to M) horizontal scanning period H among M horizontal scanning periods H within the display period Pdis, and the gradation potential VG corresponding to pixel gradation for an n-th column (n=1 to N) of an ma-th row among the display images is supplied to an n-th column of data line 464. The gradation potential VG is set according to the right-eye image GR in the right unit period UR and is set according to the left-eye image GL in the left unit period UL.

On the other hand, as shown in FIG. 4, the display control circuit 52 controls scanning line driving circuit 441 so that each scanning line 462 are sequentially selected for each horizontal scanning period H (the plurality of writing modes Wmul) based on two scanning lines adjacent to each other as a unit at the image update period Pref of each unit period U (UR, UL) Therefore, the display update period Pref includes M/2 horizontal scanning period H ((M/2)×H). In addition, when a total number M of scanning lines is an odd number, the image update period Pref includes (M+1)/2 horizontal scanning period H ((M+1)/2×H), which is similarly applied to other embodiments to be described below.

The common gradation potential VG is supplied to two pixel circuits 48 (that is to say, they are connected to the same data line 464) adjacent to each other in a longitudinal direction in correspondence with two scanning lines 462 to be simultaneously selected at the image update period Pref. Specifically, two scanning lines 462 of a (2 mb−1)th row and a 2 mb-th row are simultaneously selected at an mb-th (mb=1 to M/2) horizontal scanning period H among M/2 horizontal scanning periods H within the display update period Pref, and the gradation potential VG corresponding to the gradation of the pixel of the n-th column of the (2 mb-1)-th row among the display image is supplied to the data line 464 of the n-th column. For example, as shown in FIG. 6, the gradation potential VG corresponding to the image line #1 is supplied to each pixel circuit of first row and second row at first horizontal scanning period H within the display update period Pref, and the gradation potential VG corresponding to the image line #3 is supplied to each pixel circuit of third row and fourth row at second horizontal scanning period H. The gradation potential VG is set according to the right-eye image GR at the right unit period UR and the gradation potential VG is set according to the left-eye image GL at the left unit period UL.

As described above, when the length of the horizontal scanning period H is the same in the single sequence writing mode Wser and the plurality of sequence writing mode Wmul, a duration ((M/2)×H) required for supplying the gradation potential VG to each pixel circuit 48 by the plurality of writing modes Wmul becomes ½ times (1/k times) of duration ((M×H) required for supplying the gradation potential VG to each pixel circuit 48 by the single sequence writing mode Wser. On the other hand, the display image by a plurality of writing modes Wmul writing the gradation potential VG to a plurality of pixel circuit 48 in the unit of row k corresponds to a resolution for the display image when writing the gradation potential VG into the pixel circuit 48 with one row as a unit at the single sequence writing mode Wser and therefore the resolution (hereinafter, refer to a target resolution) in the longitudinal direction becomes ½ times (1/k times). In other words, when the image writing by the a plurality of writing modes Wmul compares with the image writing by the single sequence writing mode Wser, the resolution of the display image is lowered but the duration required for the image writing is reduced.

The left-eye image GL displayed at the display period Pdis of the immediately previous left unit period UL is changed to the right-eye image GR for each two rows at the image update period Pref within the right unit period UR. The right-eye image GR displayed at the display period Pdis of the immediately previous right unit period UR is changed to the left-eye image GL for each two rows at the image update period Pref within the left unit period UL. In other words, the right-eye image GR and the left-eye image GL are mixed at the display update period Pref.

The glasses control circuit 54 of the control circuit 28 controls the state (opened state/closed state) of each of the shutter 12 for the right eye and the shutter 14 for the left eye of the stereoscopic viewing glasses 10 in synchronization with the operation of the electro-optical panel 24 described above. Specifically, the glasses control circuit 54 controls the shutter 12 for the right eye to be in the opened state and the shutter 14 for the left eye to be in the closed state at the display period Pdis of the right unit period UR. In addition, the glasses control circuit 54 controls the shutter 12 for the right eye to be in the closed state and the shutter 14 for the left eye to be in the opened state at the display period Pdis of the left unit period UL. Therefore, the right-eye image GR displayed at the display period Pdis of the right unit period UR is transmitted through the shutter 12 for the right eye and reaches the right eye of the observer and at the same time, is blocked by the shutter 14 for the left eye. In addition, the left-eye image GL to be displayed at the display period Pdis of the left unit period UL is transmitted through the shutter 14 for the left eye and reaches the left eye of the observer and at the same time, is blocked by the shutter 12 for the right eye. The right eye can view the right-eye image GR transmitted through the shutter 12 for the right eye and the left eye can view the left-eye image GL transmitted through the shutter 14 for the left eye. Therefore, the observer perceives the three-dimensional effect of the display image.

In addition, the glasses control circuit 54 controls both of the shutter 12 for the right eye and the shutter 14 for the left eye to be in the closed state at the image update period Pref, although the display image is changed from one of the right-eye image GR and the left-eye image GL to the other for each row k at the image update period Pref as described above. However, since both of the shutter 12 for the right eye and the shutter 14 for the left eye is controlled to be in the closed state, the observer cannot perceive the mixing (crosstalk) of the right-eye image GR and the left-eye image GL at the image update period Pref. In other words, since the right-eye image GR and the left-eye image GL are reliably separated into the right eye and the left eye, the observer can clearly perceive the three dimensional effect.

With this configuration, since the gradation potential VG is supplied to each pixel circuit 48 at the image update period Pref of each unit period U by the a plurality of writing modes Wmul, when comparing with configuration in which the gradation potential VG is supplied to each pixel circuit 48 by the single sequence writing mode Wser only at each unit period U, both of the shutter 12 for the right eye and the shutter 14 for the left eye are in the closed state to reduce the duration of the image update period Pref. Therefore, it is possible to improve the brightness of the display image to be recognized by the observer. In addition, although the longitudinal resolution for the display image is lowered at the image update period Pref, since the gradation potential VG is supplied to each pixel circuit 48 by the single sequence writing mode Wser at the display period Pdis immediately after the image update period Pref, the observer cannot recognize the resolution of the display image to be lowered.

B: Second Embodiment

Then, a second embodiment of the present invention will be described. Acting or functions of each aspect being illustrated below is the same element as the first embodiment and the element uses reference number with reference to above description and each description thereof is omitted appropriately.

Figure 7:
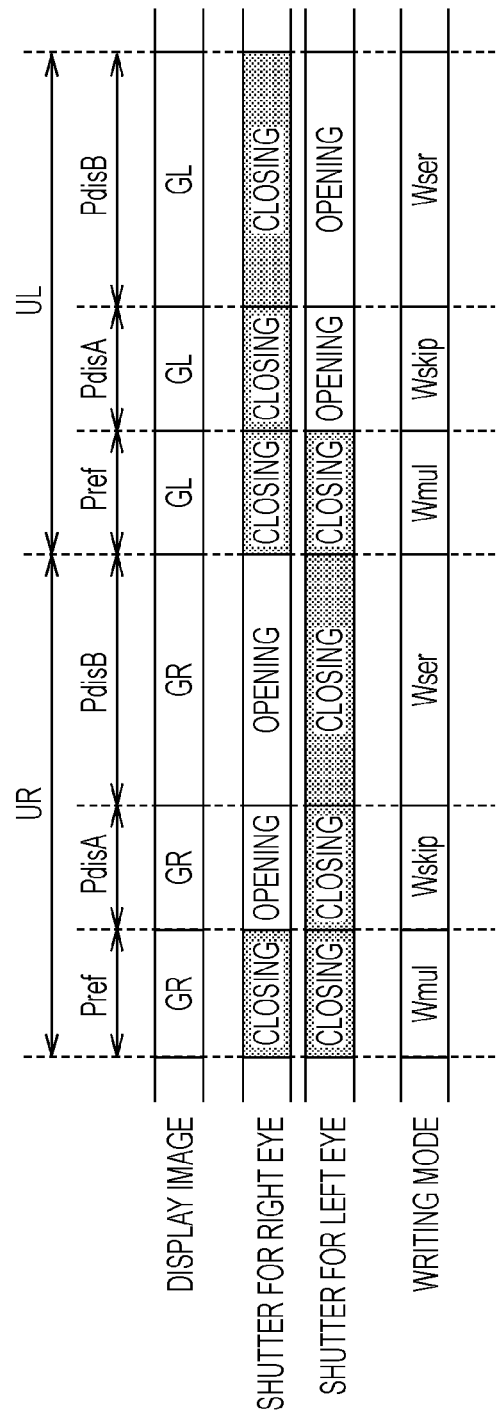
FIG. 7 is a diagram for explaining another operation example of the electro-optical device.

FIG. 7 shows an operation example of the control circuit 28 in the second embodiment. In the second embodiment, the single skip writing mode Wskip as the writing mode of the driving circuit 44 is adopted to be added to the single sequence writing mode Wser and a plurality of writing modes Wmul, similar to the first embodiment.

As shown in FIG. 7, each unit period U includes the image update period Pref, first display period PdisA and second display period PdisB. The driving circuit 44 is operated by the a plurality of writing modes Wmul at the image update period Pref and is operated by the single skip writing mode Wskip at the first display period PdisA. In addition, the display control circuit 52 controls the driving circuit 44, such that the driving circuit 44 is operated by the single sequence writing mode Wser at the second display period PdisB. The second display period PdisB includes M horizontal scanning periods H and the image update period Pref includes M/2 (M/k) horizontal scanning period H.

Figure 8:
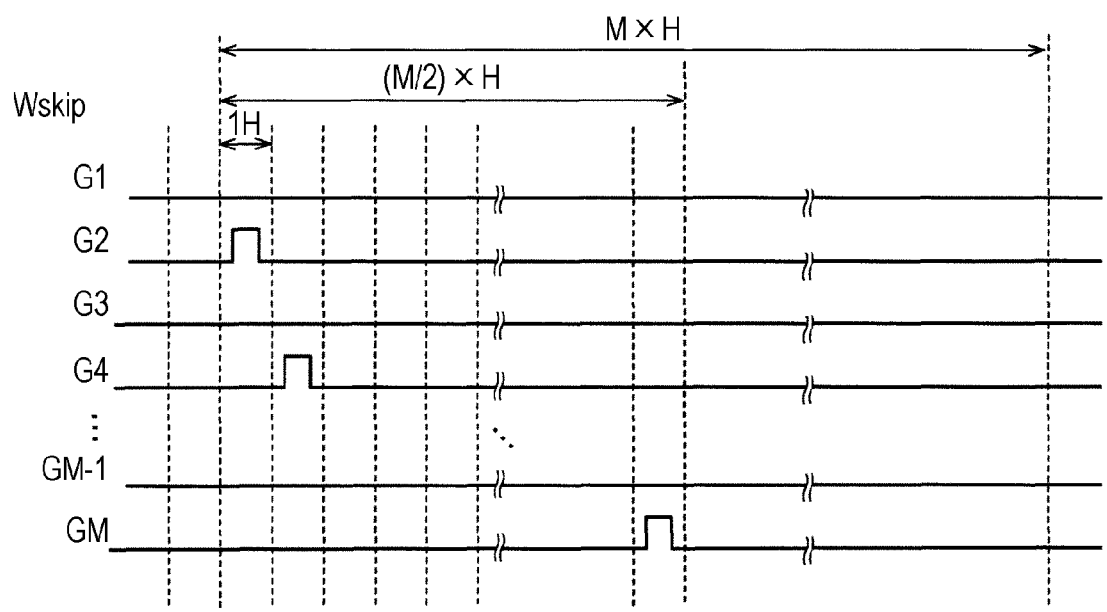
FIG. 8 shows an example of the driving time chart.

The gradation potential VG corresponding to one image line is supplied to each pixel circuit 48 corresponding to the scanning line 462 selected in two unit, similar to first embodiment, at the image update period Pref which the plurality of writing modes Wmul is selected, Therefore, as shown in FIG. 8, the display control circuit 52 controls the driving circuit 44 at the first display period PdisA immediately after the image update period Pref so that one scanning line is selected for each horizontal scanning period H. In other words, the scanning line driving circuit 441 sequentially selects the scanning lines 462 other than the scanning line 462 corresponding to image line becoming writing object of two scanning lines selected simultaneously at each horizontal scanning period H of the immediately previous image update period Pref, for each horizontal scanning period H. The data line driving circuit 443 supplies the gradation potential VG corresponding to the right-eye image GR and the left-eye image GL to the data line 464. Therefore, the first display period PdisA includes M/2 horizontal scanning period H.

Figures 9, 10:
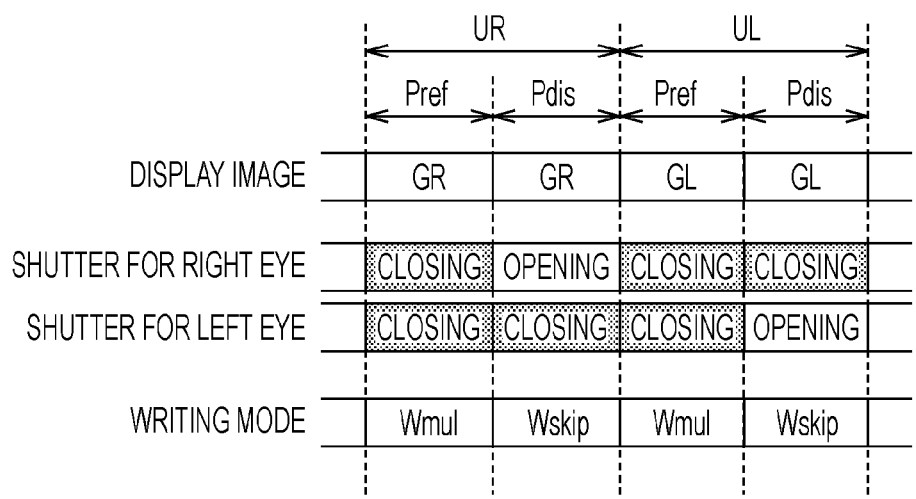
FIG. 9 shows a display example of the stereoscopic viewing image.
FIG. 10 shows another operation example of an electro-optical device.

In other words, the scanning line 462 of the second mb-th row is selected at the mb-th (mb=1 to M/2) horizontal scanning period H among m/2 horizontal scanning period H of the first display period PdisA and the gradation potential VG corresponding to the gradation for pixel of the n-th column of the second mb-th row among the display image is supplied to the data line 464 of the n-th column. For example, as shown in FIG. 9, the gradation potential VG corresponding to the image line #2 is supplied to each pixel circuit 48 of the second row at first horizontal scanning period H within the first display period PdisA and the gradation potential VG corresponding to the image line #4 is supplied to each pixel circuit of 4 row at second the horizontal scanning period H. Each scanning line 462 of (2 mb−1) row is not selected at the first display period PdisA. The gradation potential VG is set according to the right-eye image GR at the right unit period UR and the gradation potential VG is set according to the left-eye image GL at the left unit period UL.

Further, the image line number corresponding to the gradation potential VG supplied to each pixel circuit 48 at each of the image update period Pref and the first display period PdisA or the row number of the scanning line 462 selected at the first display period PdisA is changed appropriately. For example, two scanning lines 462 of the (2 mb−1)-th row and the 2 mb-th row are simultaneously selected at the mb-th horizontal scanning period H within the image update period Pref. The gradation potential VG corresponding to the gradation (image line #2 mb)) for the pixel of the n-th column of the 2 mb-th row among the display image is supplied to the data line 464 of the n-th column. Then the scanning line 462 of (2 mb−1)-th row is selected at the mb-th the horizontal scanning period H within the first display period PdisA, and the gradation potential VG corresponding to the gradation (image line #(2 mb−1)) for the pixel of the n-th column of (2 mb−1)-th row among the display image is preferably supplied to the n-th column of the data line 464.

After writing by the single skip writing mode Wskip at the first display period PdisA, the writing by the single sequence writing mode Wser at the second display period PdisB is performed. The writing by the single sequence writing mode Wser is performed similar to first embodiment and therefore the description thereof is omitted.

As shown in FIG. 7, the glasses control circuit 54 of the control circuit 28 controls the shutter 12 for the right eye to be the opened state and the shutter 14 for the left eye to be in the closed state at the display period Pdis (PdisA, PdisB) of the right unit period UR and controls the shutter 12 for the right eye to be in the closed state and the shutter 14 for the left eye to be the opened state at the display period Pdis (PdisA, PdisB) of the left unit period UL. It is the same as first embodiment in that both of the shutter 12 for the right eye and the shutter 14 for the left eye are controlled to be in the closed state at the image update period Pref of each unit period U. Therefore, similar effects can be achieved with the first embodiment.

Although the image having the longitudinal resolution reduced to ½ as compared with a target resolution (M×N) is displayed at the end of the image update period Pref, the image writing by the single skip writing mode Wskip is started immediately after the start of the first display period PdisA, such that the image line not written by the plurality of writing modes Wmul is written complementarily. Therefore, Reduction in the resolution is resolved at the end of the first image period PdisA to be displayed with the image having the target resolution. As mentioned earlier, time required for the writing by the single skip writing mode Wskip is shorter than time required for the writing by the single sequence writing mode Wser. Therefore, with this configuration, as compared with first embodiment for performing the writing by the single sequence writing mode Wser after writing by the plurality of writing modes Wmul, it is possible to shorten the time until you see the target resolution image.

According to the above embodiment, both of the first image period PdisA of the single skip writing mode Wskip and the second display period PdisB of the single sequence writing mode Wser are included in the unit period U but second display period PdisB is omitted. In other words, as shown in FIG. 10, the image update period Pref and the first image period PdisA are set only at each unit period U, such that the image writing by the plurality of writing modes Wmul and the image writing by the single skip writing mode Wskip only are preferably performed. According to such a configuration, the image writing by the single sequence writing mode Wser is not performed, thereby shortening a switching period of the right-eye image GR and the left-eye image GL.

In other word, As shown in FIG. 5, according to the configuration performing the image writing by the single sequence writing mode Wser immediately after the image writing by the single skip writing mode Wskip, since the shutter 12 for the right eye and the shutter 14 for the left eye enter the opened state at the period of the image writing by the single sequence writing mode Wser, a length of the display period Pdis occupied by each unit period U can be relatively long. Therefore, it is possible to improve the brightness of the display image to be recognized by the observer, thereby reducing display unevenness and improving the quality of the display image. In particular, if the high-intensity light is projected with a projection-type display device, the effect is exceptionally pronounced.

C: Configuration Example of a Scanning Line Driving Circuit

Figure 11:
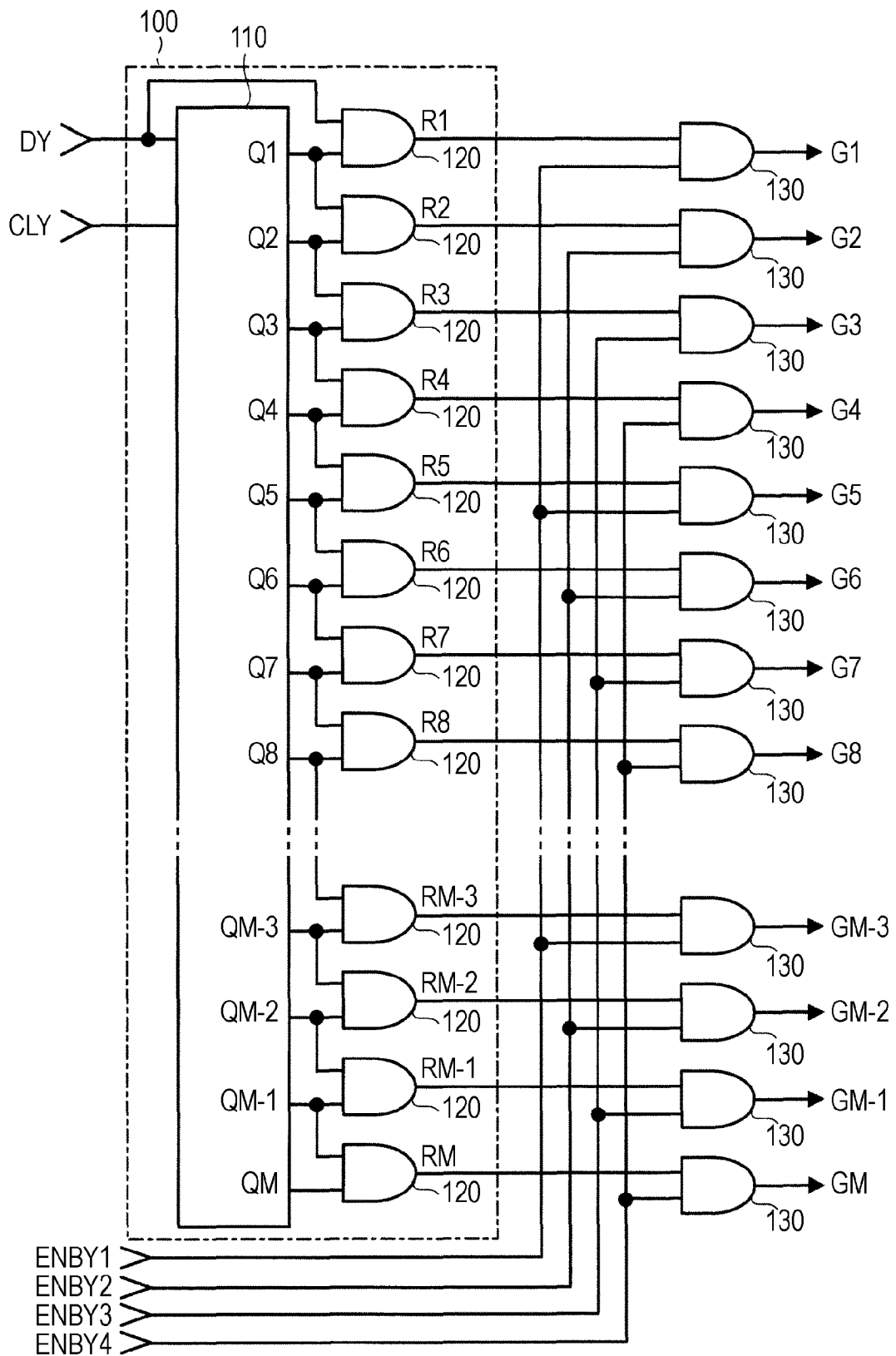
FIG. 11 is a schematic diagram of a scanning line driving circuit.

FIG. 11 is a schematic diagram of the scanning line driving circuit 441 in each of these forms. The scanning line driving circuit 441 includes a signal generating circuit 100, and M AND circuits 130 corresponding to the number of the scanning lines 462. The signal generating circuit 100 includes a shift register 110 having M stages and M AND circuits 120. The shift register 110 is supplied with a start pulse DY and a clock signal CLY from the display control circuit 52.

The shift register 110 sequentially transfers the start pulse DY in synchronization with the clock signal CLY so as to output the transfer pulse Q1, Q2, . . . , QM. m-th (m=1 to M) AND circuit 120 outputs a logical product of the transfer pulse Qm−1 of preceding stage (start pulse DY in first AND circuit 120) and the transfer pulse Qm of self stage as a control pulse Rm. That is, the signal generating circuit 100 sequentially outputs control pulses R1, R2, . . . , RM of the system M based on the start pulse DY and the clock signal CLY supplied. The m-th AND circuit 130 outputs the logical product of the control pulse Rm output from the signal generating circuit 100 and an enable signal ENBY (any one of ENBY 1 to 4) supplied from the display control circuit 52 to the scanning line 462 of the m-th row as a scanning signal Gm. When M AND circuits 130 having 4 adjacent to each other as a unit is divided into a plurality of (M/4) sets, the enable signal ENBYi is supplied to the i-th (i=1 to 4) AND circuit 130 in each set.

Figure 12:
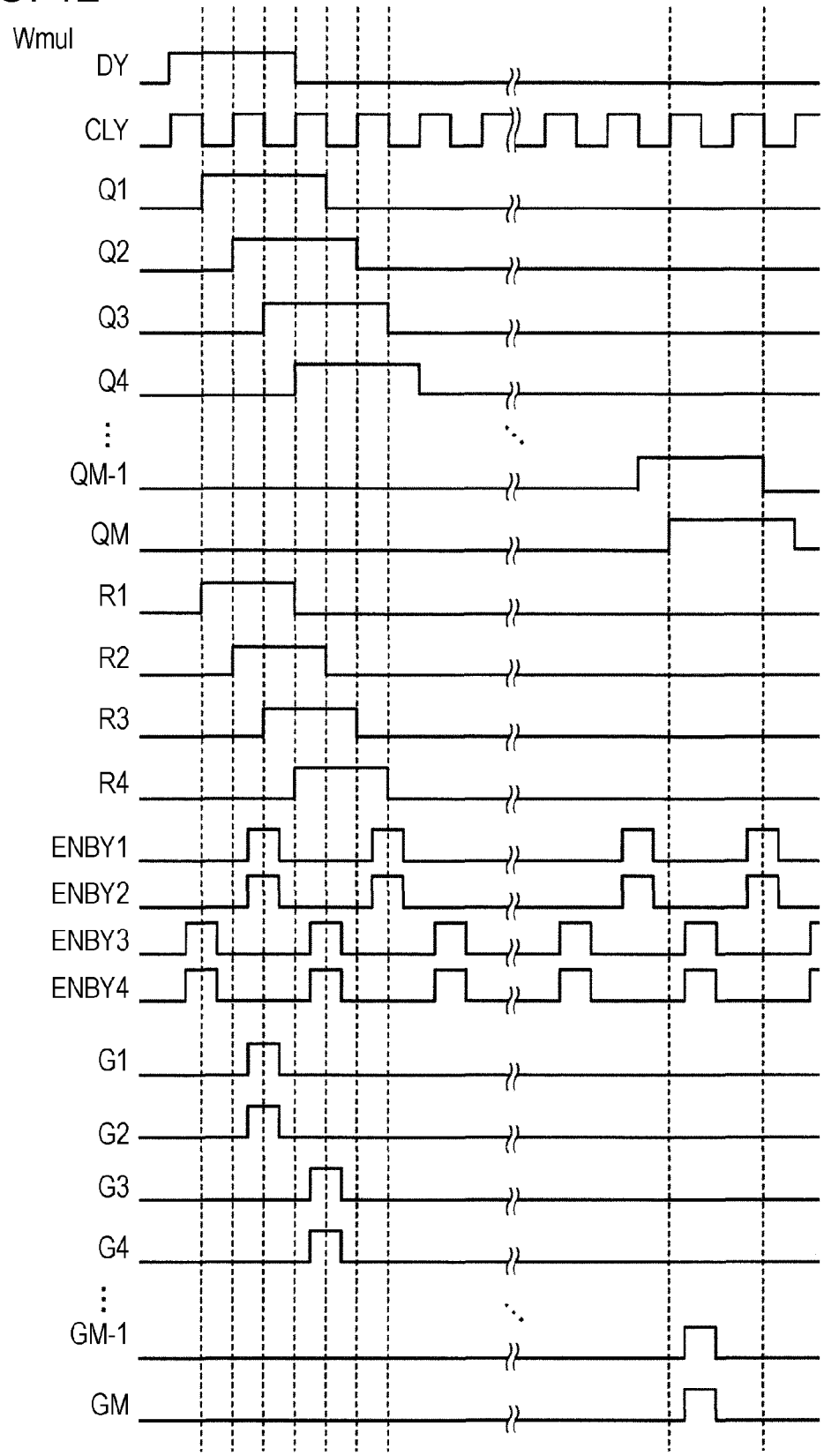
FIG. 12 shows an example of a time chart for driving the scanning line driving circuit.

FIG. 12 shows an example of the operation of the scanning line driving circuit 441 at the plurality of writing modes Wmul. As shown in FIG. 12, two systems adjacent to each other among the control pulse R1, R2, . . . , RM of system M has a section overlapping each other. Then, the enable signal ENBY supplied to each AND circuit 130 corresponding to the control pulse R thereof is simultaneously set to be the active level within the period which the control pulse R of two systems adjacent to each other overlap each other. For example, the enable signal ENBY1 and the enable signal ENBY2 are simultaneously set to be the active level at the period which the control pulse R1 and R2 overlap each other and the enable signal ENBY3 and the enable signal ENBY4 are simultaneously set to be the active level at the period which the control pulse R3 and R4 overlap each other. Thus, as described in above embodiments, the scanning signals supplied to the two scanning lines 462 adjacent to each other are simultaneously set to be the active level.

Figure 13:
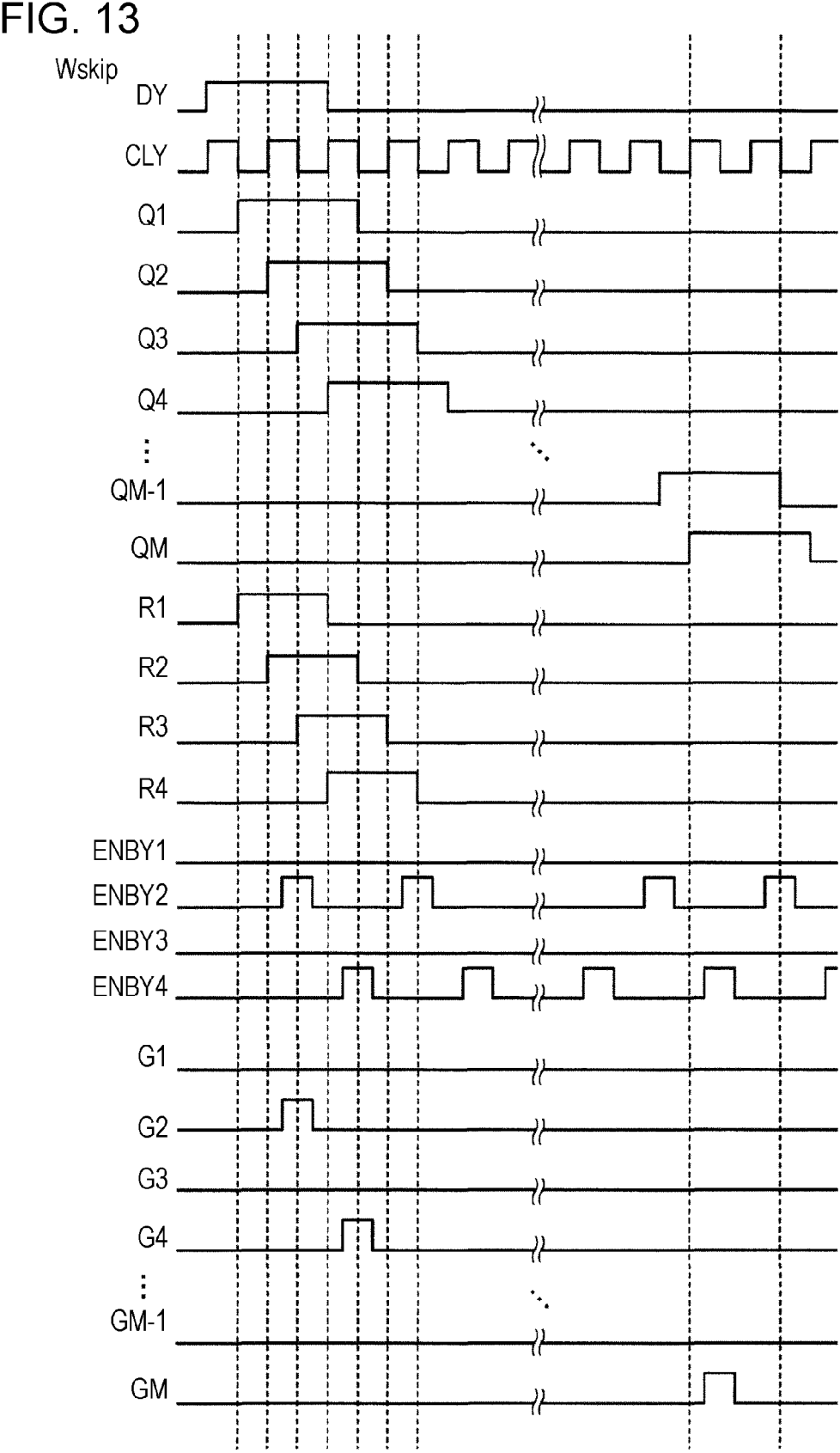
FIG. 13 shows an example of the time chart for driving the scanning line driving circuit.

FIG. 13 shows an example of the operation of the scanning line driving circuit 441 by the single skip writing mode Wskip. Any one of the enable signals ENBY supplied to the AND circuit 130 corresponding to the control pulse R thereof is simultaneously set to be the active level, within the period which the control pulse R of two systems adjacent to each other overlap each other, by the single skip writing mode Wskip. For example, the enable signal ENBY2 only are set to be the active level at the period which the control pulse R1 and the control pulse R2 overlap each other and the enable signal ENBY4 only are set to be the active level at the period which the control pulse R3 and the control pulse R4 overlap each other. Thus, the scanning signals supplied to each scanning line 462 of even-numbered rows among M scanning lines 462 sequentially are set to be the active level.

Figure 14:
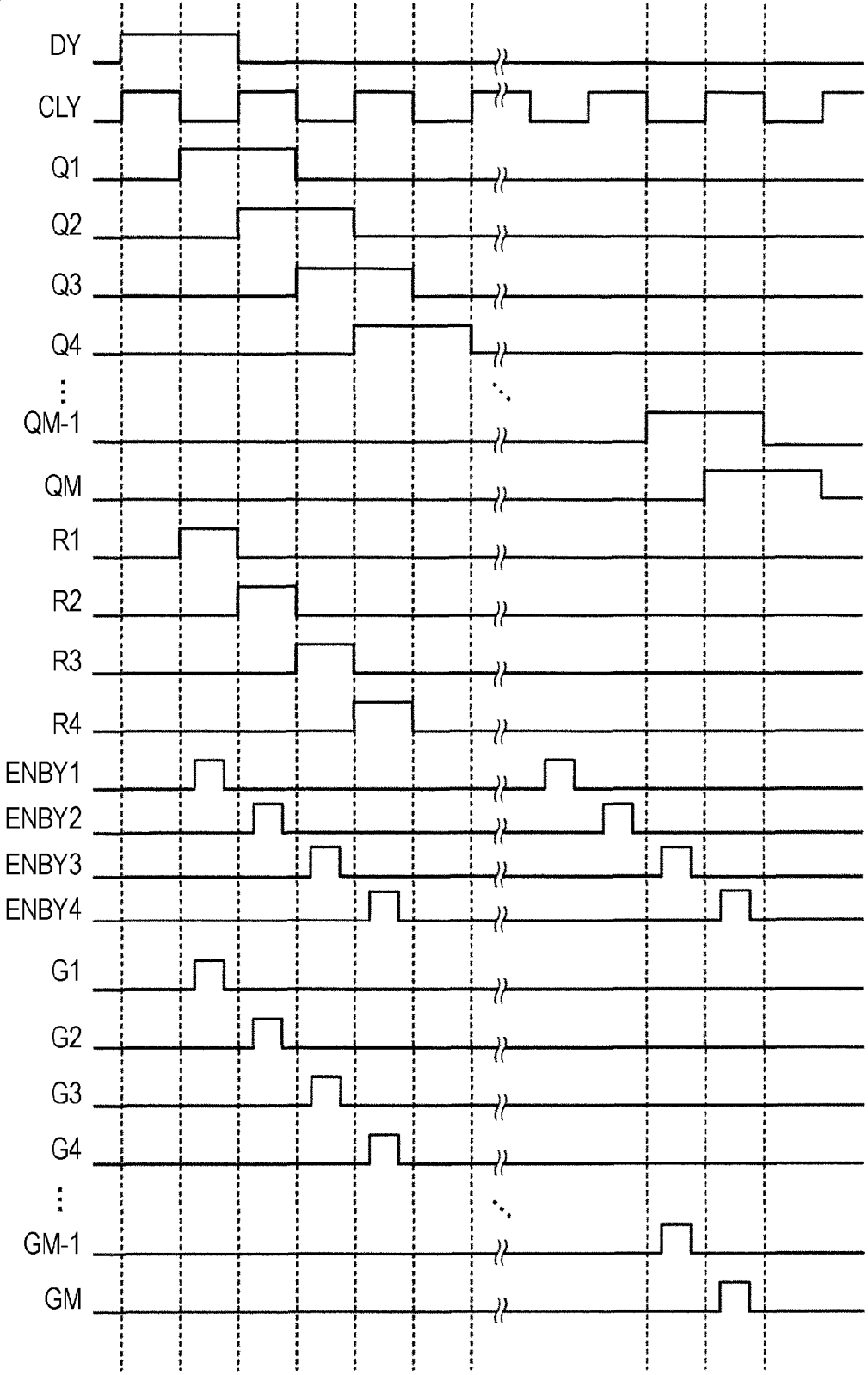
FIG. 14 shows an example of the time chart for driving the scanning line driving circuit.

FIG. 14 shows an example of the operation of the scanning line driving circuit 441 by the single sequence writing mode Wser. When comparing the plurality of writing modes Wmul with the single skip writing mode Wskip each other by the single sequence writing mode Wser, the period of the clock signal CLY is set to be twice. Thus, the control pulse R of two systems adjacent to each other does not overlap each other. The enable signals ENBY supplied to the m-th the AND circuit 130 are set to be the active level within the period of the m-th the control pulse Rm. Thus, each of the scanning signals G1 to GM sequentially are set to be the active level.

As described above, according to the scanning line driving circuit 441 illustrated in FIG. 11, it is possible to switch arbitrarily the plurality of writing modes Wmul, the single sequence writing mode Wser and the single skip writing mode Wskip by controlling the enable signal ENBY1 to ENBY4 and the clock signal CLY.

D: Configuration Example of a Data Line Driving Circuit

Figure 15:
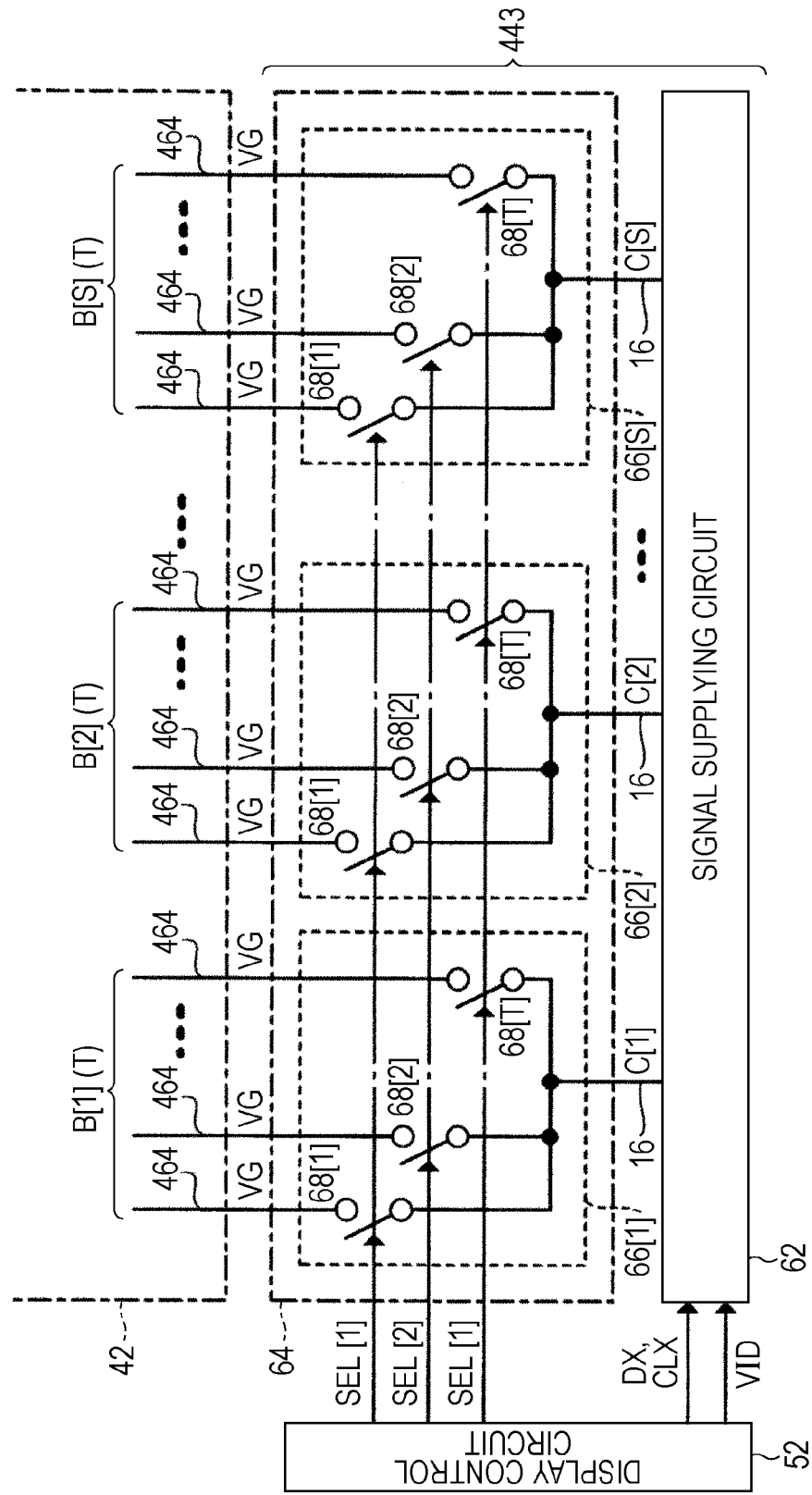
FIG. 15 is a schematic diagram of a data line driving circuit.

FIG. 15 is a schematic diagram of a data line driving circuit 443 in each of these forms. The data line driving circuit 443 includes a signal supplying circuit 62 and a signal distribution circuit 64. The data line driving circuit 443 controls each potential VG of N data lines 464 in synchronization with the selection of each scanning line 462 by the scanning line driving circuit 441. The signal supplying circuit 62 is implemented in the form of the integrated circuit (chip), and the signal distribution circuit 64 and the scanning line driving circuit 441 are composed by thin-film transistors formed on the surface of the substrate together with the pixel circuit 48. However, the implementation form of the data line driving circuit 443 and the scanning line driving circuit 441 can be arbitrarily changed. N data lines 464 are divided into S (S=N/T) wiring group B [1] to B [S] with 4 adjacent to each other as a unit. The signal distribution circuit 64 and the signal supply circuit 62 are interconnected by S control line 16 corresponding to a distinct wiring group B [S].

The signal supply circuit 62 of FIG. 15 supplies the control signal C[1] to C[S] of system S corresponding to the distinct wiring group B[s] (s=1 to S) to each control line 16 in parallel based on the start pulse DX, the clock signal CLX and the image signal VID supplied from the display control circuit 52. Each control signal C[1] to C[S] supplied is selected by the selection signal SEL[t] (t=1 to T) to become the gradation potential VG and is supplied to the plurality of data lines 464.

As shown in FIG. 15, The signal distribution circuit 64 includes S distribution circuits 66[1] to 66[S] corresponding to the distinct wiring group B[S]. The s-th distribution circuits 66[s] is a circuit (demultiplexer) distributing the control signal C[s] supplied to the s-th control line 16 to each of T data lines 464 of the wiring group B[s] and includes T switching 68[1] to 68[T] corresponding to distinct T data lines 464 of the wiring group B[s]. A switch 68[t] of the t-th distribution circuit 66 is interposed between t-th data line 464 among T data lines 464 of the wiring group B[s] and the s-th control line 16 among S control lines 16 to control electrical connection (conducting/non-conducting) therebetween. Each selection signal SEL[t] generated by the display control circuit 52 is supplied to a gate for the t-th switch 68[t] (total of S switching 68[T] in each signal distribution circuit 64) in parallel within each of S distribution circuits 66[1] to 66[S]. The selection signal SEL[t] of system T sequentially is set to be the active level within the period selected by one scanning line 462 and T switching 68[1] to 68[T] sequentially conduct. Therefore, the control signal C[s] supplied to the s-th distribution circuits 66[s] is distribute to each T data line 464 within the wiring group B[s] in time division.

E: Modified Example

Each of these forms above may be transformed diversely. A concrete aspect of the transformation is illustrated below. Aspects of any two or more chosen from the following illustration may be merged appropriately.

In the embodiments described above, although describing case in which there are two selection units of the scanning line 462 (k=2) at the plurality of writing modes Wmul, it is preferable that the number of the scanning lines 462 which may be simultaneously selected be at least three. All scanning lines 462 may be selected simultaneously.

The image (the right-eye image GR and the left-eye image GL) displayed at the image update period Pref is arbitrarily set. For example, it is preferable that the image setting entire pixels as single gradation (for example, white, black, or halftone) is displayed at the image update period Pref. That is, it is satisfactory that the image displayed at the image update period Pref is the image that clears the immediately previous display image (the right-eye image GR and the left-eye image GL) so that the observer cannot perceive mixing of the right-eye image GR and the left-eye image GL. Therefore, it does not require the image in common with the image period Pdis immediately after.

Figure 16:
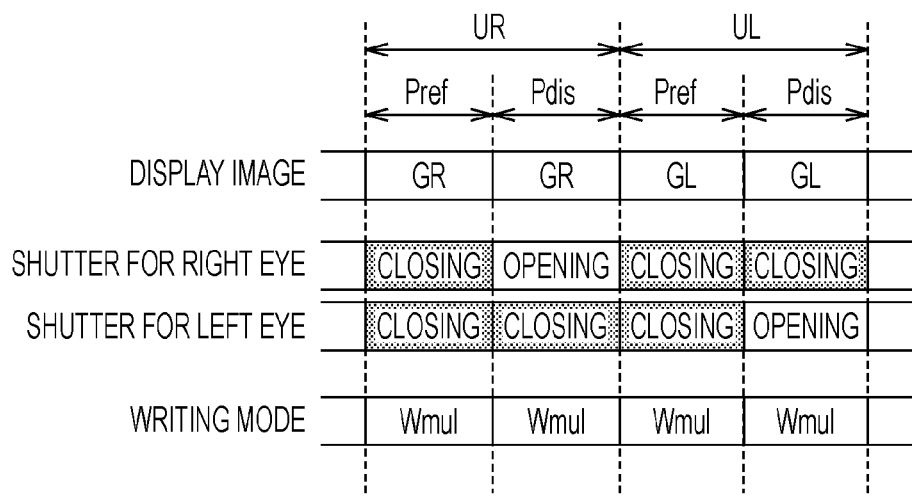
FIG. 16 is a diagram showing a modification of the operation of an electronic optical device.

In the embodiments described above, although a combination of the plurality of writing modes Wmul, the single sequence writing mode Wser and the single skip writing mode Wskip are illustrated, the combination of the operation mode is arbitrarily set. For example, As shown in FIG. 16, the display control circuit 52 controls the driving circuit 44 to operate by the plurality of writing modes Wmul at the image update period Pref within each unit period U and controls the driving circuit 44 to operate by the plurality of writing modes Wmul at the image period Pdis.

With this configuration, since the scanning line driving circuit 441 does not need to sequentially select one by one the plurality of scanning lines 462, a lowering of the ability for the scanning line driving circuit 441 necessary to drive the scanning line 462 is suppressed. Thus, even when using a circuit having a delayed driving velocity to the scanning line driving circuit 441, which can display an image on the electro-optical panel 24.

A retention period may be provided to stop the supply (operation of the driving circuit 44) of the gradation potential VG of each pixel circuit 48. For example, the retention period is set immediately after the image period Pdis in the configuration of first embodiment and FIG. 10 and the retention period is set immediately after second image period PdisB in the second embodiment. Since a liquid crystal element CL functions as a capacitive element, the potential of the pixel electrode 481 is retained with the immediately previous gradation potential VG supplied even in the retention period. In other words, the display image displayed at the display period Pdis is retained even in the retention period.

The shutter 12 for the right eye and the shutter 14 for the left eye are hold to be in the opened state continuously from the immediately previous display period Pdis at the retention period. Therefore, it is possible to improve the brightness of the display image to be recognized by the observer.

In addition, when comparing the configuration having the retention period for stopping the supply of gradation potential VG with the configuration not providing the retention period, it is possible to reduce the power consumption of the driving circuit 44.

In the embodiments described above, although both of the shutter 12 for the right eye and the shutter 14 for the left eye are controlled to be in the closed state from a start of the image update period Pref to a end, the periods controlling both of the shutter 12 for the right eye and the shutter 14 for the left eye to be in the closed state are changed appropriately. For example, if it is within the range that the observer essentially cannot perceive the mixing of the right-eye image GR and the left-eye image GL, it is preferable that any one of the shutter 12 for the right eye and the shutter 14 for the left eye may be changed to be in the opened state before the advent of the end of the image update period Pref. In this case, a longer shutter opening time relative to the shutter 12 for the right eye and the shutter 14 for the left eye to improve the brightness of the display image is more known to the observer. In addition, any one of the shutter 12 for the right eye and the shutter 14 for the left eye may be changed to be in the opened state after the start of display period Pdis. In this case, the period to view the image having resolution lower than the target resolution by the observer can be reduced, thereby improving the quality of the display image to be recognized by the observer.

Figure 17:
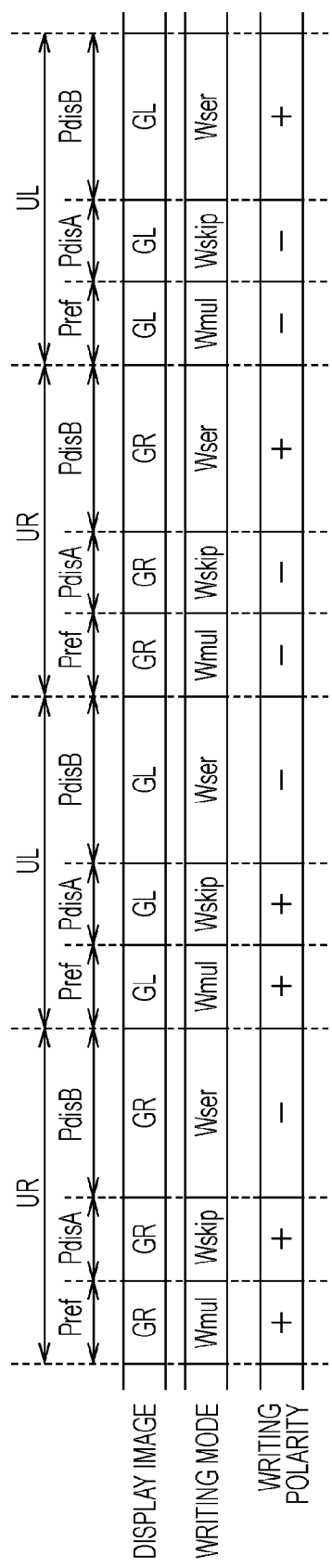
FIG. 17 shows an example of writing polarity of gradation potential.

The period to reverse the polarity of gradation potential VG (the polarity of the voltage applied to the liquid crystal element CL) is arbitrary. For example, as shown in FIG. 17, the gradation potential VG at the image update period Pref and the first display period PdisA, and the gradation potential VG at second display period PdisB are set to be the reverse polarity in the second embodiment that the image update period Pref, first display period PdisA and second display period PdisB are included at each unit period U. In addition, it is also preferable to set the gradation potential VG with the reverse polarity for each pair of right unit period UR and the left unit period UL in tandem with each other.

As shown in FIG. 17, when the gradation potential VG has the same polarity at the image update period Pref and first display period PdisA, since the gradation potential VG among rows adjacent to each other has the same polarity, for example, when comparing the gradation potential VG among rows adjacent to each other with the gradation potential VG in the configuration (for example, the configuration that has the gradation potential VG with the reverse polarity at the image update period Pref and first display period PdisA) set with the reverse polarity, it is possible to suppress the occurrence of disclination or leaks etc. In addition, the smaller the distance between each pixel circuit, the more the effects for reverse polarity writing become noticeable. Therefore, as illustrated above, if the gradation potential VG among the adjacent rows have the same polarity, the configuration (for example, electro-optical panel used in projection display apparatus) having each pixel circuit with high-definition is also exceptionally suitable.

F: Application

An Electro-optical device 20 illustrated in each of the above forms may be used in various electronic devices.

Figure 18:
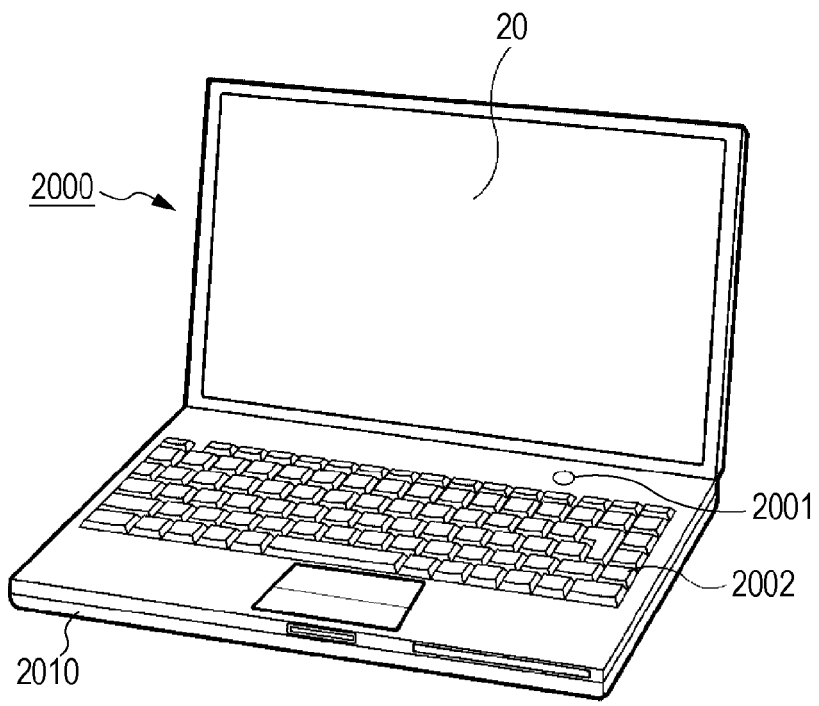
FIG. 18 shows an example of an electronic apparatus using the electronic optical devices.
Figure 19:
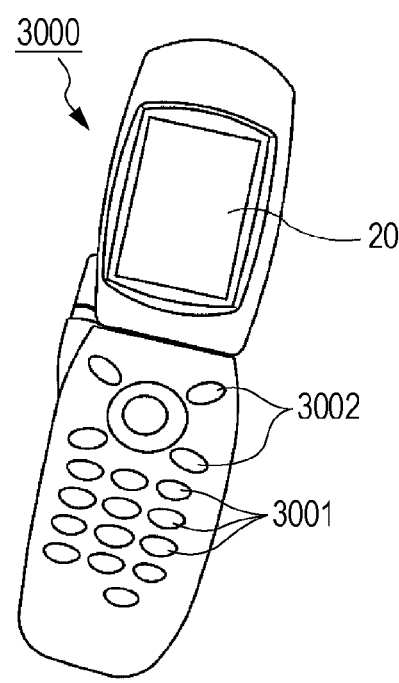
FIG. 19 shows an example of the electronic apparatus using the electronic optical devices.
Figure 20:
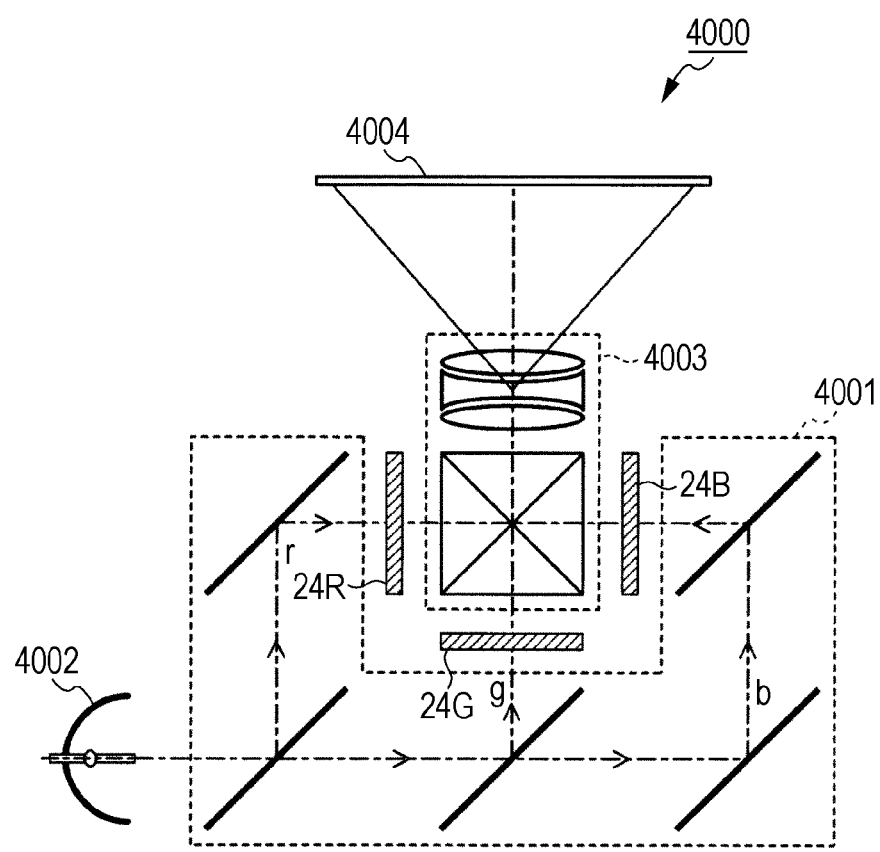
FIG. 20 shows an example of the electronic apparatus using the electronic optical devices.
Figure 21:
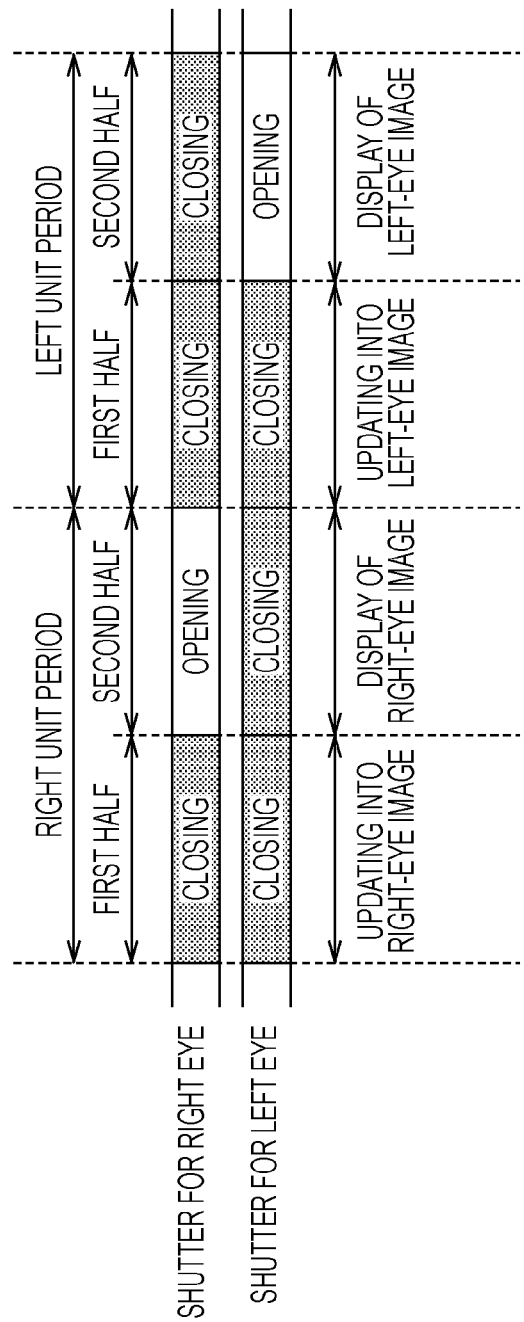
FIG. 21 is a diagram for explaining the stereoscopic viewing operation in the related art.

A concrete form of an electronic apparatus adopting electro-optical device 20 is exemplified in FIG. 18 to FIG. 20.

FIG. 18 is a perspective view of a portable personal computer that uses the electro-optical device 20. PC 2000 includes the electro-optical device 20 displaying various images, and a body portion 2010 disposed with a power switch 2001 or a keyboard 2002.

FIG. 19 is a perspective view of a portable phone with the electro-optical device 20 applied. A portable phone 3000 includes a plurality of operation buttons 3001, the scroll buttons 3002, and an electro-optical device 20 displaying various images. Scroll the screen to be displayed on the electro-optical device 20 by manipulating the scroll buttons 3002.

FIG. 20 shows a schematic diagram of the projection-type display device 4000 (three-plate type projector) applying electro-optical device 20. A projection-type display device 4000 includes three electro-optical panel 24 (24R, 24G, 24B) corresponding to these different colors (red, green, blue) and the control circuit not shown. A illumination optical system 4001 supplies a red component r of light emitted from the lighting system (light source) 4002 to the electro-optical panel 24R, supplies a green component g to the electro-optical panel 24G and supplies a blue component b to the electro-optical panel 24B. Each electro-optical panel 24 functions as an electro-optical modulator (light bulb) modulating each monochromatic light supplied from the illumination optical system 4001 according to the display image. A projection optical system 4003 combines a light emitted from each the electro-optical panel 24 and projects to a projection surface 4004.

In addition, in addition to the equipment illustrated in FIG. 18 to FIG. 20, portable information terminals (PDA: Personal Digital Assistants), digital still cameras, televisions, video cameras, car navigation system, automotive indicator (instrument panel), electronic organizers, electronic paper, calculators, word processors, workstations, TV telephone, POS terminal, printers, scanners, copiers, video players, equipment with a touch panel and the like are examples of electronic apparatuses applying the electro-optical device according to the present invention.

The entire disclosure of Japanese Patent Application No. 2010-187640, filed Aug. 24, 2010is expressly incorporated by reference herein.

What is claimed is:

1. An electro-optical device comprising:
a light source that emits a light;
an electro-optical panel that modulates the light, the electro-optical panel including a first gate line, a second gate line being adjacent to the first gate line, a data line intersecting the first gate line and the second gate line, a first pixel circuit being disposed at position corresponding to intersection between the first gate line and the data line, a second pixel circuit being disposed at position corresponding to intersection between the second gate line and the data line, and a driving circuit driving the first pixel circuit and the second pixel circuit such that the first pixel circuit and the second pixel circuit modulate the light into a modulated light;
a stereoscopic viewing glasses that includes a first shutter for a right eye and a second shutter for a left eye; and
a glass control circuit that controls the first shutter for the right eye and the second shutter for the left eye to be in a opened state or a closed state, the first shutter for the right eye and the second shutter for the left eye transmitting the modulated light in the opened state,
wherein the first pixel circuit and the second pixel circuit are supplied a first data signal for a right eye and modulate the light into a first modulated light on the basis of the first data signal in a first period,
wherein the second pixel circuit is supplied a second data signal for the right eye and modulates the light into a second modulated light on the basis of the second data signal in a second period after the first period,
wherein the first pixel circuit and the second pixel circuit are supplied a third data signal for a left eye and modulate the light into a third modulated light on the basis of the third data signal in a third period after the second,
wherein the second pixel circuit is supplied a fourth data signal for the left eye and modulates the light into a fourth modulated light on the basis of the fourth data signal in a fourth period after the third period, and
wherein the glass control circuit controls the first shutter and the second shutter to be in the closed state in the first period and the third period, the first shutter to be in the opened state and the second shutter to be in closed state in the second period, and the second shutter to be opened state and the first shutter to be closed state in the fourth period.

2. The electro-optical device according to claim 1, wherein the first shutter and the second shutter are composed of a liquid crystal shutter.

3. The electro-optical device according to claim 1, the electro-optical device being configured such that:
the second period commences after the first period is completed; and
the fourth period commences after the third period is completed.

4. An electronic apparatus comprising the electro-optical device according to claim 1.

5. An electro-optical device comprising:
a light source that emits a light;
an electro-optical panel that modulates the light, the electro-optical panel including a first gate line, a second gate line being adjacent to the first gate line, a data line intersecting the first gate line and the second gate line, a first pixel circuit being disposed at position corresponding to intersection between the first gate line and the data line, a second pixel circuit being disposed at position corresponding to intersection between the second gate line and the data line, and a driving circuit driving the first pixel circuit and the second pixel circuit such that the first pixel circuit and the second pixel circuit modulate the light into a modulated light;
a stereoscopic viewing glasses that includes a first shutter for a right eye and a second shutter for a left eye; and
a glass control circuit that controls the first shutter and the second shutter to be in a opened state or a closed state, the first shutter and the second shutter transmitting the modulated light in the opened state,
wherein the first pixel circuit and the second pixel circuit are supplied a first data signal for a right eye and modulate the light into a first modulated light on the basis of the first data signal in a first period,
wherein the second pixel circuit is supplied a second data signal for the right eye and modulates the light into a second modulated light on the basis of the second data signal in a second period after the first period,
wherein the first pixel circuit is supplied the first data signal for the right eye and modulates the light into the first modulated light on the basis of the first data signal in a third period after the second period,
wherein the second pixel circuit is supplied the second data signal for the right eye and modulates the light into the second modulated light on the basis of the second data signal in a fourth period after the third period,
wherein the first pixel circuit and the second pixel circuit are supplied a third data signal for a left eye and modulate the light into a third modulated light on the basis of the third data signal in a fifth period after the fourth period, wherein the second pixel circuit is supplied a fourth data signal for the left eye and modulates the light into a fourth modulated light on the basis of the fourth data signal-in a sixth period after the fifth period, wherein the first pixel circuit is supplied the first data signal for the right eye on the basis of the first data signal in a seventh period after the sixth period, wherein the second pixel circuit is supplied the second data signal for the right eye on the basis of the second data signal in a eighth period after the seventh period, and wherein the glass control circuit controls the first shutter and the second shutter to be in the closed state in the first period and the fifth period, the first shutter to be in the opened state and the second shutter to be in closed state in the second period, the third period and the fourth period, the second shutter to be opened state and the first shutter to be closed state in the sixth period, the seventh period and the eighth period.

6. The electro-optical device according to claim 5, wherein the first shutter and the second shutter are composed of a liquid crystal shutter.

7. The electro-optical device according to claim 5, the electro-optical device being configured such that:
the second period commences after the first period is completed; and
the sixth period commences after the fifth period is completed.

8. An electronic apparatus comprising the electro-optical device according to claim 5.

* * * * *